(12) United States Patent
Brown

(10) Patent No.: US 10,593,225 B2
(45) Date of Patent: Mar. 17, 2020

(54) MANUAL TRANSMISSION TRAINING TOOL

(71) Applicant: Linda Rogers Brown, Jacksonville, FL (US)

(72) Inventor: Linda Rogers Brown, Jacksonville, FL (US)

( * ) Notice: Subject to any disclaimer, the term of this patent is extended or adjusted under 35 U.S.C. 154(b) by 185 days.

(21) Appl. No.: 15/666,635

(22) Filed: Aug. 2, 2017

(65) Prior Publication Data
US 2019/0043381 A1 Feb. 7, 2019

(51) Int. Cl.
*G09B 9/04* (2006.01)

(52) U.S. Cl.
CPC .................. *G09B 9/04* (2013.01)

(58) Field of Classification Search
USPC ............. 434/29, 62, 69, 71; 446/7; D21/433
See application file for complete search history.

(56) References Cited

U.S. PATENT DOCUMENTS

| | | | | |
|---|---|---|---|---|
| 4,034,484 A * | 7/1977 | Radice | | G09B 9/04 434/71 |
| 4,150,497 A * | 4/1979 | Weber | | G09B 9/04 434/71 |
| 4,221,072 A * | 9/1980 | Monin | | A63H 33/00 446/7 |
| 4,265,047 A * | 5/1981 | Meyer | | A63H 33/00 446/397 |
| 4,750,888 A * | 6/1988 | Allard | | G09B 9/05 434/64 |
| 4,949,119 A * | 8/1990 | Moncrief | | G09B 9/05 273/148 B |
| 5,015,189 A * | 5/1991 | Wenzinger, Jr. | | G09B 9/048 348/121 |
| 5,197,003 A * | 3/1993 | Moncrief | | F16H 61/18 434/45 |
| 6,270,349 B1 * | 8/2001 | Ng | | G09B 9/05 434/62 |
| 7,156,026 B2 * | 1/2007 | McClellion | | A63F 13/02 108/43 |
| 7,717,711 B2 * | 5/2010 | MacDonald | | G09B 9/08 434/55 |
| 7,828,157 B2 * | 11/2010 | Thorsen | | A63F 13/06 211/26.2 |
| 8,016,595 B2 * | 9/2011 | Aoki | | A63F 13/10 434/61 |
| 8,469,711 B2 * | 6/2013 | Best | | G09B 9/05 434/71 |
| 9,224,308 B2 * | 12/2015 | Martel | | G09B 9/12 |
| 2006/0040239 A1 * | 2/2006 | Cummins | | G09B 9/05 434/62 |
| 2009/0163283 A1 * | 6/2009 | Childress | | A63F 13/08 463/47 |
| 2015/0356879 A1 * | 12/2015 | Best | | G09B 9/048 434/62 |

* cited by examiner

*Primary Examiner* — Kurt Fernstrom
(74) *Attorney, Agent, or Firm* — Furr Law Firm; Jeffrey Furr, Esq.

(57) ABSTRACT

The current invention is a driving training tool. The training tool is a combination of a tachometer and speedometer with a stick transmission shifter and pedals. The tachometer and speedometer reflect the input from the pedals and shifter. This can be used by driving schools and learners to practice shifting skills, such as up-shifting, down-shifting, or double-clutching. Each part of the tool can detach for easy storage and folding. The training tool is made of plastic, making it light weight and easy to transport.

5 Claims, 7 Drawing Sheets

MANUAL TRANSMISSION TRAINING TOOL

CROSS-REFERENCES TO RELATED APPLICATIONS (IF ANY)

None.

BACKGROUND

1. Field of the Invention

This invention relates to driving learning accessories and particularly tools for learning to operate a manual transmission.

2. Description of Prior Art

When learning to drive, there are many things to learn. It is difficult to develop skills without practicing behind the wheel. Because of this, and for convenience, fewer and fewer people are learning to drive manual transmission vehicles. For most purposes, this is acceptable. Manual transmission driving is still widely used in utility vehicles, such as work trucks and semi-trucks. Semi-trucks have additional elements for manual transmissions, such as double clutch shifting. Driving schools are currently able to teach these skills through in-vehicle practice and driving simulators.

There is still room for improvement in the art.

SUMMARY OF THE INVENTION

The current invention is a portable kit for an individual to practice using a manual transmission from anywhere, before driving a car.

The manual transmission training tool simulates the conditions for driving related to shifting. It is composed of a tachometer, speedometer, pedals, transmission, and an emulator running a simulation based on how user interacts with pedals and transmission. For example, as the gas pedal is pressed, the tachometer and speedometer would show increases.

The training tool is plastic, foldable, and portable. The individual pieces are connected when in use and disconnect for storage.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

There are a number of significant design features and improvements incorporated within the invention.

The current invention, as shown in FIGS. 1 through 6, is a portable kit 1 for an individual to practice using a manual transmission from anywhere, before driving a car. It can be used for truck driving schools. It is a mini product that will teach truck driving students how to upshift and down shift before they even get inside a truck. They will know how to reach the RPM with the shift pattern.

Figure 1:
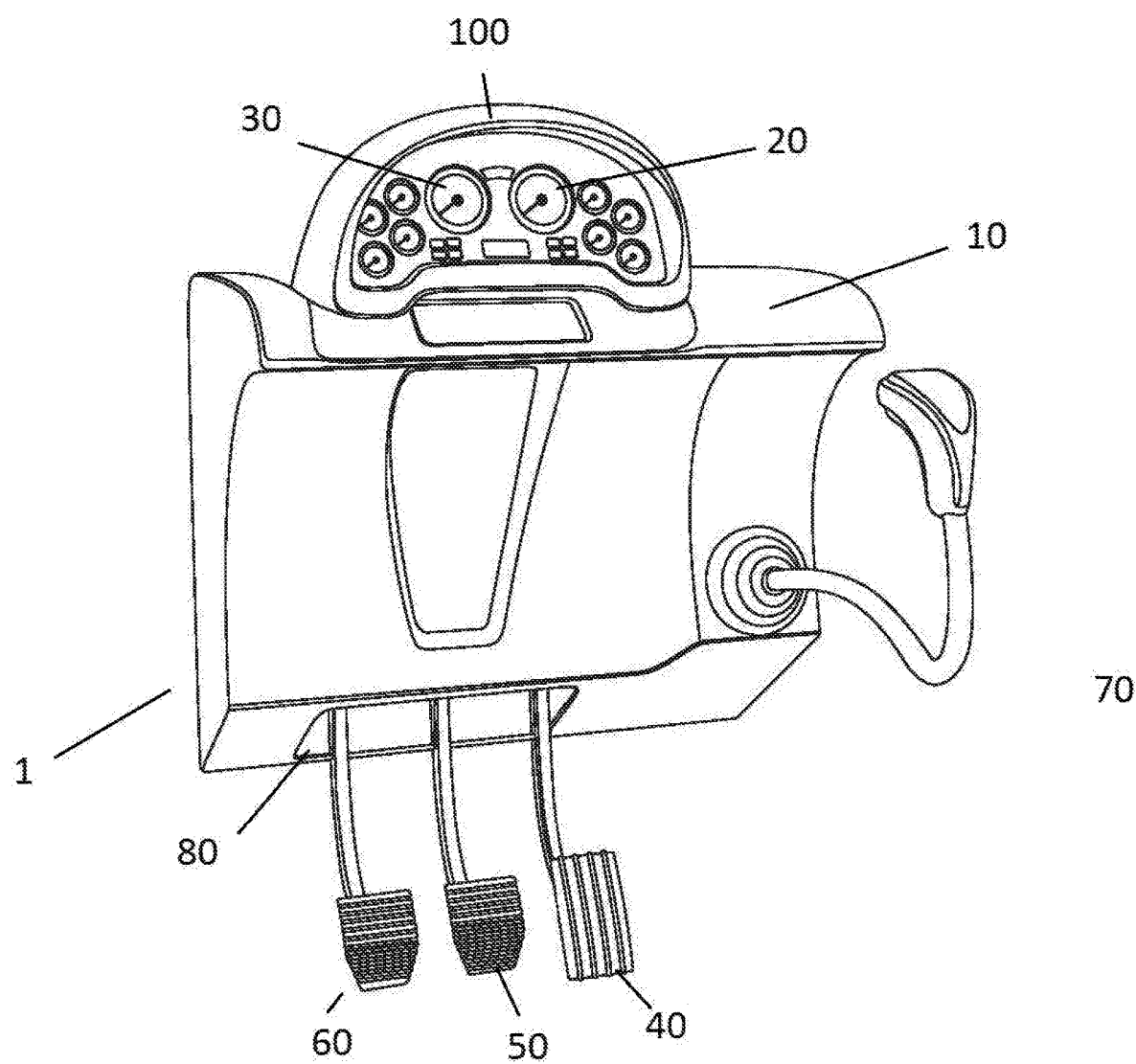
FIG. 1 shows a line drawing of the transmission training kit from the front.
Figure 2:
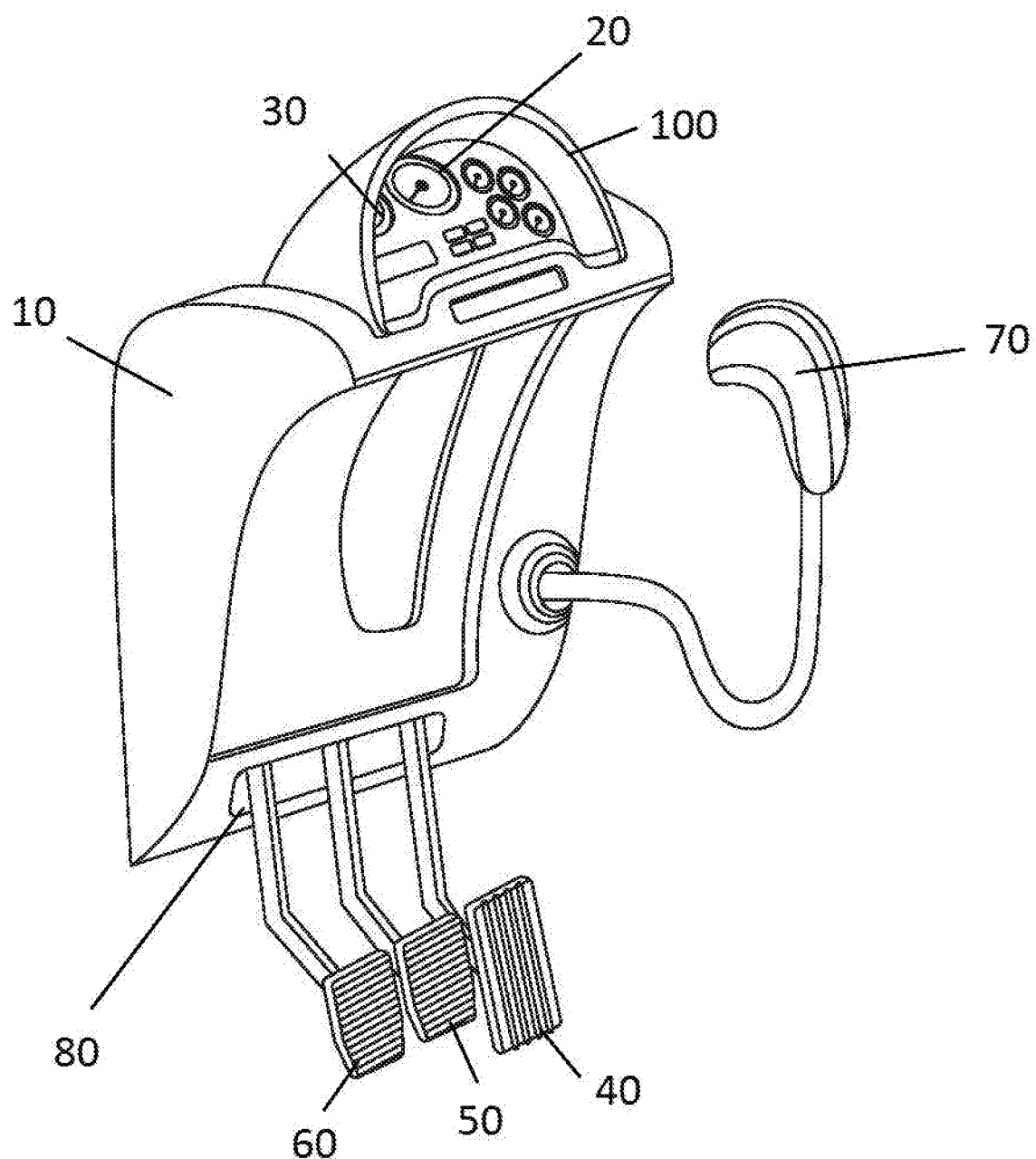
FIG. 2 shows a line drawing of the kit from a different angle.
Figure 3:
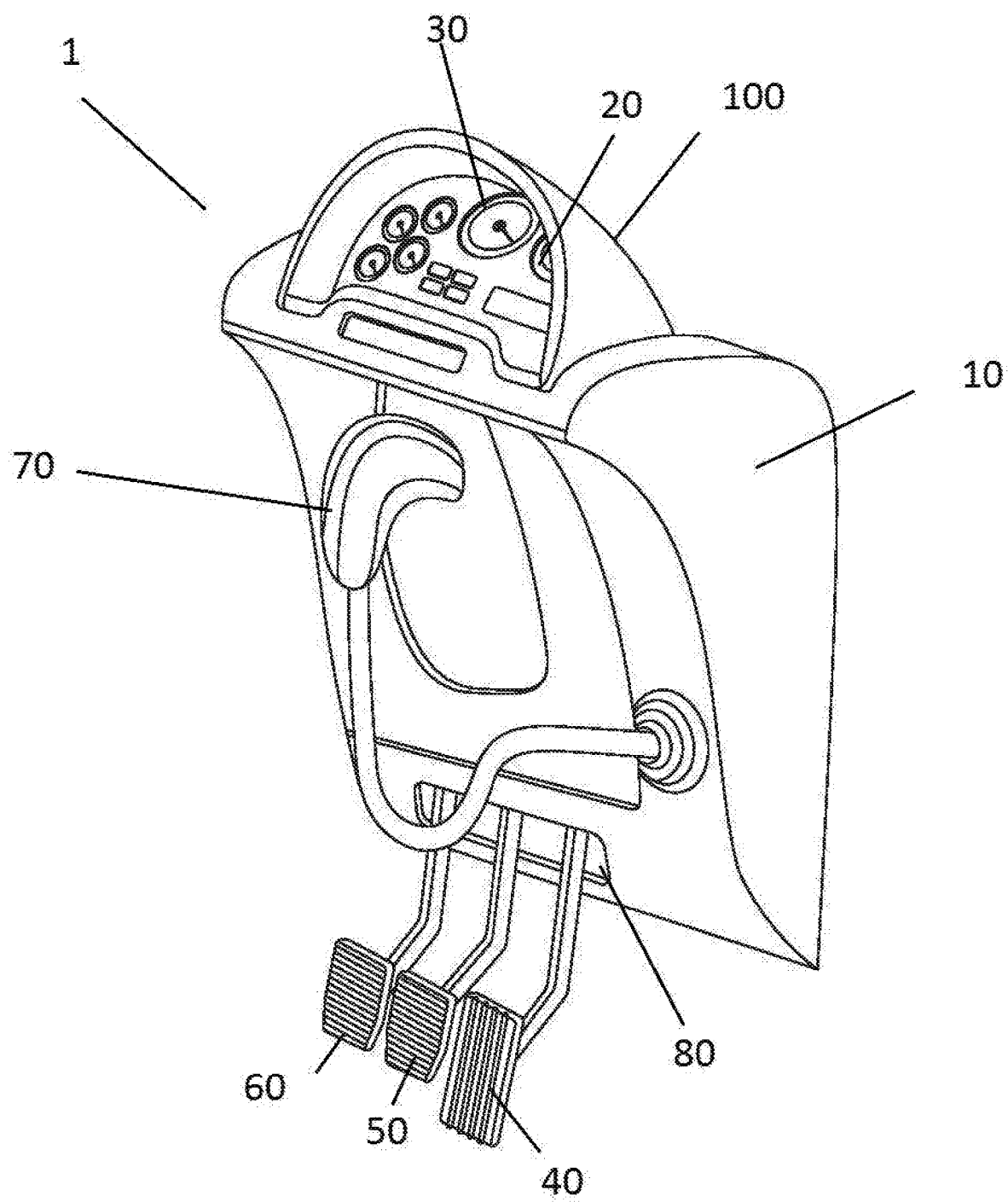
FIG. 3 shows a line drawing of the kit from a different angle.
Figure 4:
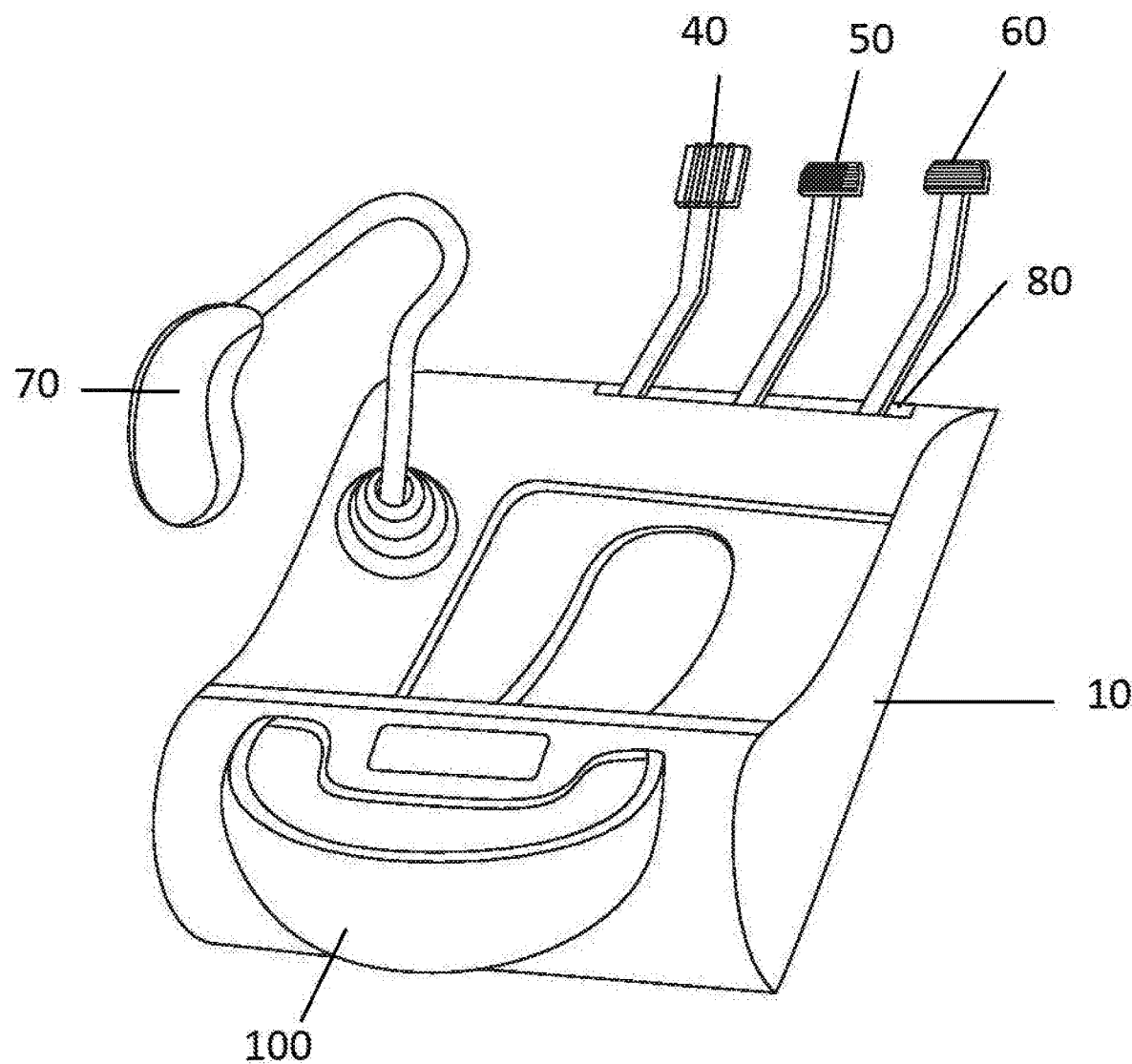
FIG. 4 shows a line drawing of the kit from a downward angle.
Figure 5:
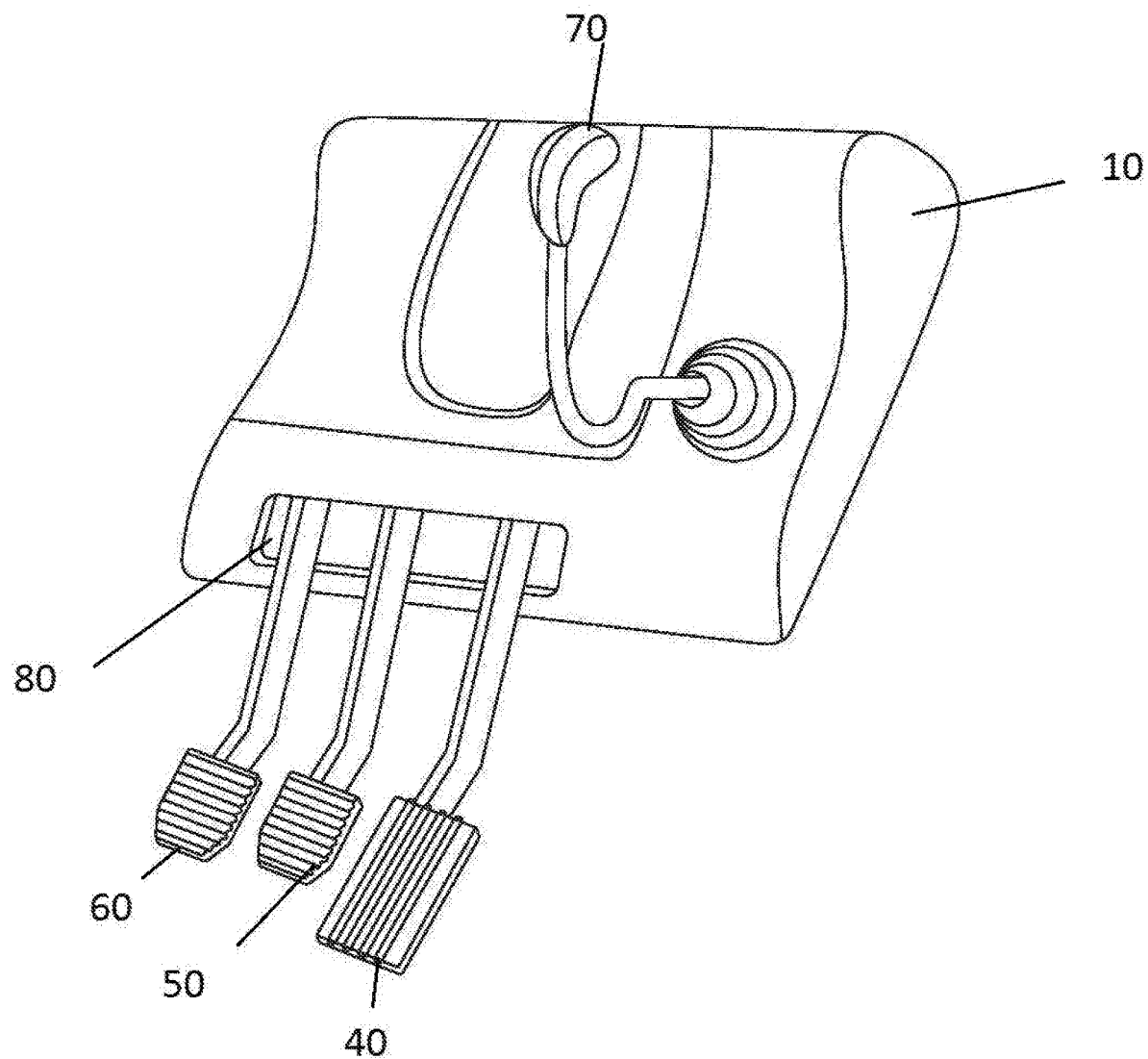
FIG. 5 shows a line drawing of the kit from a different angle.
Figure 6:
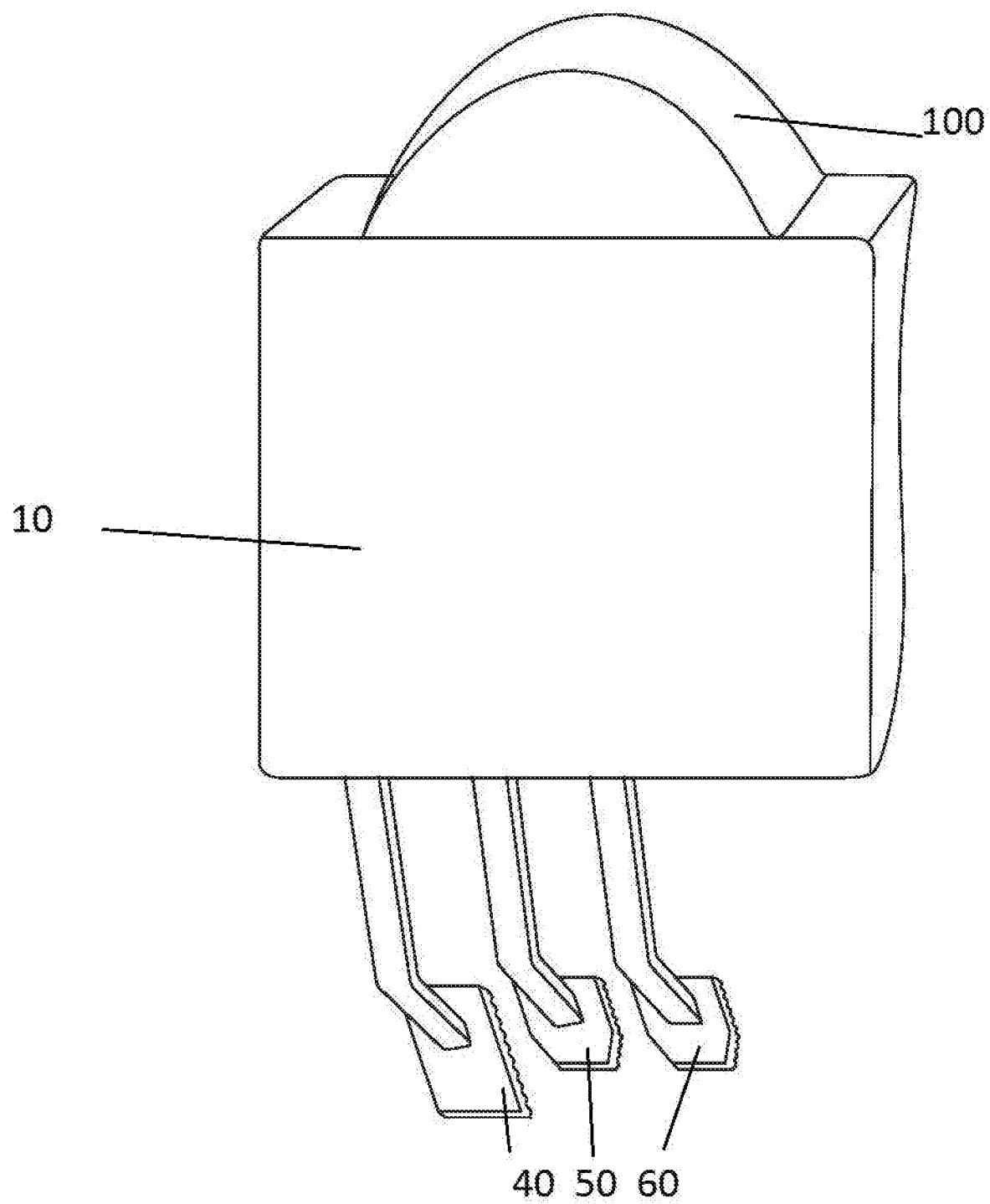
FIG. 6 shows a line drawing of the kit from behind.
Figure 7:
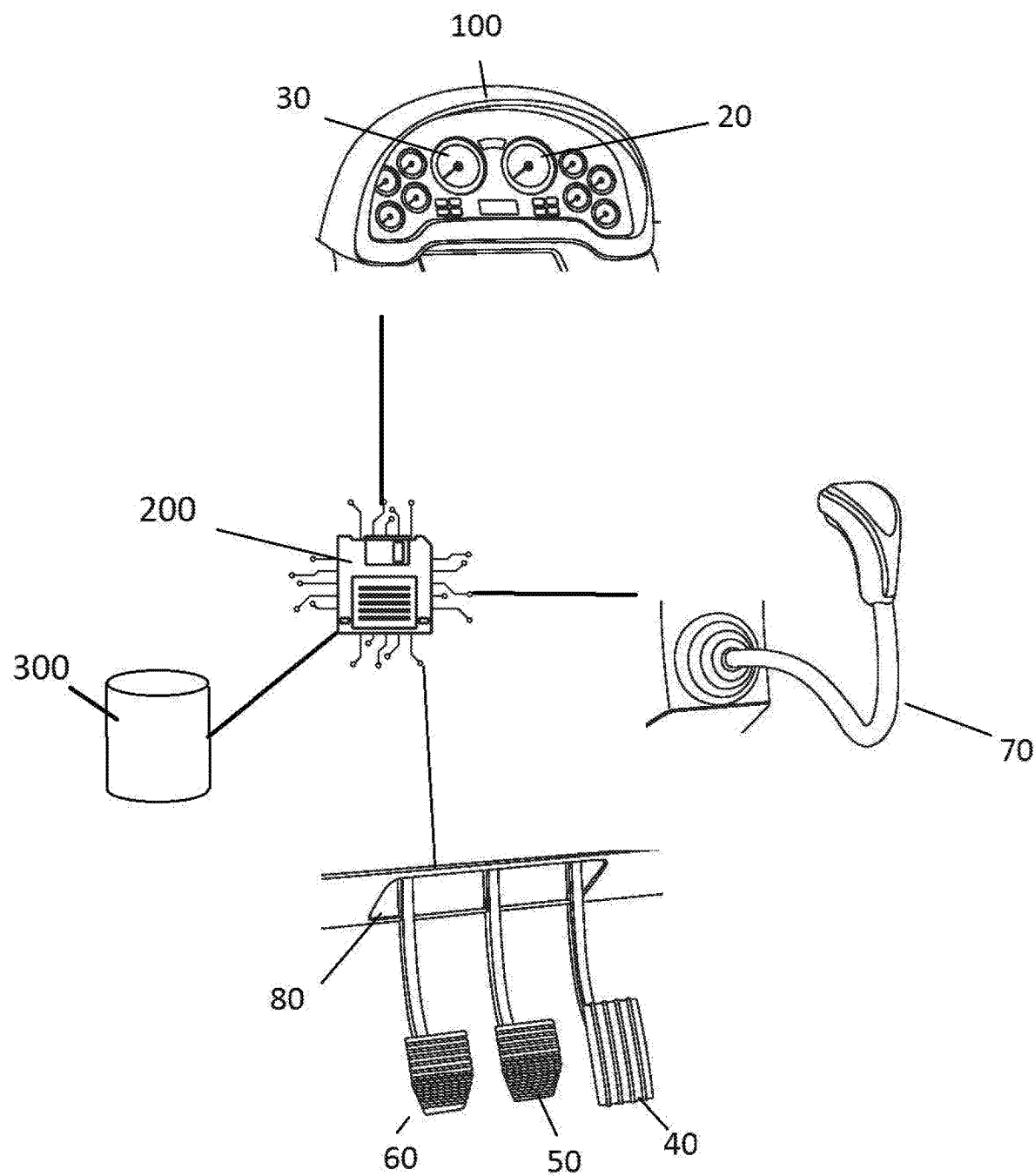
FIG. 7 shows the microprocessor and its connections.

The manual transmission training tool 1 simulates the conditions for driving related to shifting. It is composed of a tachometer 20, speedometer 30, pedals (40, 50, 60), transmission, and an emulator running a simulation on a microprocessor 200 based on how user interacts with pedals and transmission, as shown in FIG. 7. For example, as the gas pedal 40 is pressed, the tachometer 20 and speedometer 30 would show increases.

The simulation will have data and processing code can reside in the non-transitory memory of the one or more microprocessor. It can be written in any standard programming language.

The kit 1 will have a console 10 which would have a dashboard 100 on the top. The console 10 will have a shifter 70 the extends out from the front of the console 10. The shifter 70 is a simulated gear shift which is used to shift gears in simulation. The shifter 70 will be in the shape of a standard car floor gear shift. The positions for the gears can be preset or be set to match the positions of the vehicle that it being trained for.

The console 10 will have a dashboard 100 on the top. The dashboard 100 will be designed to look like a standard dashboard. It will have the tachometer 20 and speedometer 30 gauges on it. The tachometer 20 will give the simulated RPM based on the speed and the simulated gear that is being used. The speedometer 30 will give the simulated speed. The dashboard 100 will also give a warning light or indicator when the gears need to be changed, up or down based on the simulated speed and RPMs.

Out of an opening 80 of the bottom of the console 10, the kit 1 will have a simulated gas pedal 30, brake pedal 40 and clutch pedal 50. The pedals (30, 40, 50) include foot pads and extension rods which connect the foot pads to the console 10. These are used to provide input to the simulation so that it can predict the speed and RPMs so that it can tell if a user needs to shift gears up or down. The user places their foot on the foot pads and presses backward or releases forward to provide just as is done in a motor vehicle. The pedals extend out from that bottom on the extension rods so that they are at the proper position for a user's legs. In one embodiment of the kit 1, the pedal's length can be changed based on the user.

The speedometer 20 and tachometer 30 work to show students engine speed has to be at the right speed to match the street speed so it can have a smooth shift into the gears. It has to show speedometer moving up as gears are changing make the user are at the right speed for the right gear. It should also have a switch to change from the low gears to high gears.

The kit 1 will have a power source 300 like a battery which will supply power to the kit 1.

The training kit 1 is plastic, foldable, and portable. The individual pieces such as the pedals (30, 40. 50) and the shifter 70 are connected when in use and disconnect for storage.

Advantages

The innovative driver training tool allows a user to practice shifting before being behind the wheel of a vehicle. This allows a new driver to be more focused on other driving skills, increasing the safety of behind-the-wheel training.

Driving simulators are expensive and stationary devices, largely limiting use to within a driving school. The innovative driving training tool is affordable and portable for any learner.

Although the present invention has been described in considerable detail with reference to certain preferred versions thereof, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A device comprising:
a console to train a user on using a manual transmission with a top and bottom with a simulated gear shifter, a simulated tachometer, a simulated speedometer and a plurality of pedals with a processor which simulates the shifting of gears where the console has a dashboard with simulated tachometer and simulated speedometer on the top, where the pedals are a simulated gas pedal, simulated clutch, and simulated brake, where console has a front and the simulated gear shifter extends out from that front, where console has a bottom and an opening at the bottom and where the pedals extend from the opening, where the pedals include foot pads and extension rods which connect the foot pads to the console where the pedals extend out from that bottom on the extension rods.

2. A device according to claim 1;
where a user is informed when to shift gears based on the simulation.

3. A device according to claim 1;
where the kit 1 is foldable.

4. A device according to claim 1;
where the kit 1 is portable.

5. A device according to claim 1;
where the pedals and the shifter are connected when in use and disconnect for storage.

* * * * *